US012322244B2

(12) United States Patent
Cox et al.

(10) Patent No.: US 12,322,244 B2
(45) **Date of Patent: *Jun. 3, 2025**

(54) GAME SPACE PERFORMANCE AWARENESS

(71) Applicant: Dell Products L.P., Round Rock, TX (US)

(72) Inventors: Tyler R. Cox, Austin, TX (US); Jake M. Leland, Round Rock, TX (US); Marc R. Hammons, Round Rock, TX (US); Ryan N. Comer, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/871,643

(22) Filed: Jul. 22, 2022

(65) Prior Publication Data

US 2024/0029505 A1 Jan. 25, 2024

(51) Int. Cl.
*G07F 17/32* (2006.01)

(52) U.S. Cl.
CPC ...... *G07F 17/3227* (2013.01); *G07F 17/3202* (2013.01)

(58) Field of Classification Search
CPC . G07F 17/3227; G07F 17/3202; G07F 17/323
See application file for complete search history.

(56) References Cited

U.S. PATENT DOCUMENTS

| | | | | |
|---|---|---|---|---|
| 9,529,579 | B2 * | 12/2016 | Brunet | G06F 8/65 |
| 2021/0234938 | A1 | 7/2021 | Cox et al. | |
| 2021/0322869 | A1 | 10/2021 | Knoppert | |
| 2022/0176240 | A1 | 6/2022 | Aurongzeb et al. | |

OTHER PUBLICATIONS

PCGameBenchmark, "Can I Run It?" Jun. 25, 2019, https://web.archive.org/web/20190625013148/https://www.pcgamebenchmark.com/ (Year: 2019).*

* cited by examiner

*Primary Examiner* — Kevin Y Kim
(74) *Attorney, Agent, or Firm* — Larson Newman, LLP

(57) ABSTRACT

Game spaces are configured for best computer functioning. A game space is defined by hardware, software, and network (s). Each game space in a home or business is characterized for gaming performance capabilities. Individual devices, peripherals (such wireless gaming controllers, steering wheels, and joysticks), and even networks are also characterized for gaming performance capabilities. Cloud-based services then determine hardware, software, and network configurations that, when combined as a best game space, yield the best computer functioning for computer gaming. The cloud-based services may even auto-install or auto-execute the configurations that yield the best computer functioning for computer gaming. Once the game spaces are characterized and configured, gaming content may be recommended that exploits the best computer functioning.

20 Claims, 16 Drawing Sheets

GAME SPACE PERFORMANCE AWARENESS

FIELD OF THE DISCLOSURE

This disclosure generally relates to information handling systems, and more particularly relates to hardware and networking evaluations for improved computer functioning in computer gaming.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Game spaces are configured for best computer functioning. A game space is defined by hardware, software, and network(s). Each game space in a home or business is characterized for gaming performance capabilities. Individual devices, peripherals (such as wireless gaming controllers, steering wheels, and joysticks), and even networks are also characterized for gaming performance capabilities. Cloud-based services then determine hardware, software, and network configurations that, when combined as a best game space, yield the best computer functioning for computer gaming. The cloud-based services may even auto-install or auto-execute the configurations that yield the best computer functioning for computer gaming. Once the game spaces are characterized and configured, gaming content may be recommended that exploits the best computer functioning.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
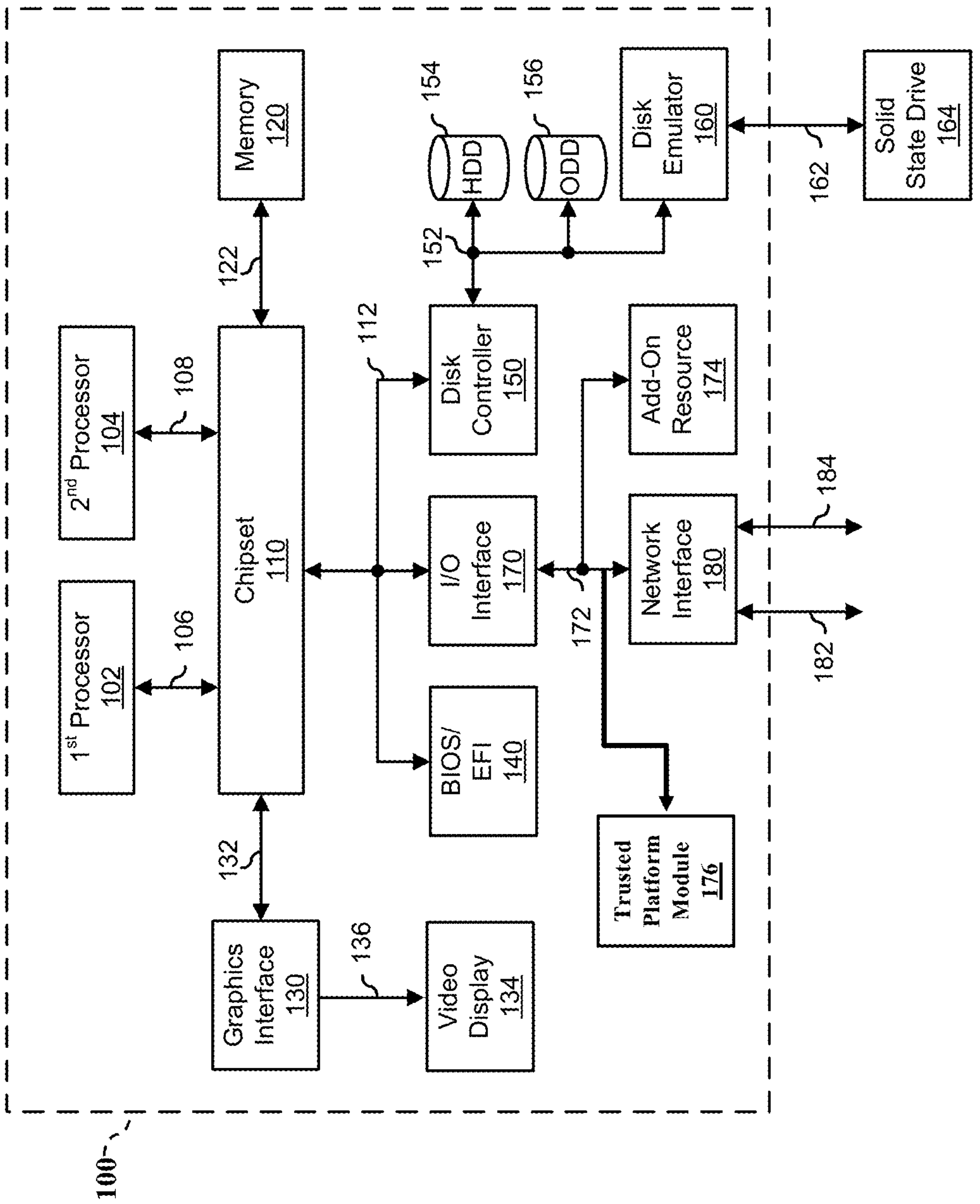
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit ($I^2C$) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Figure 2:
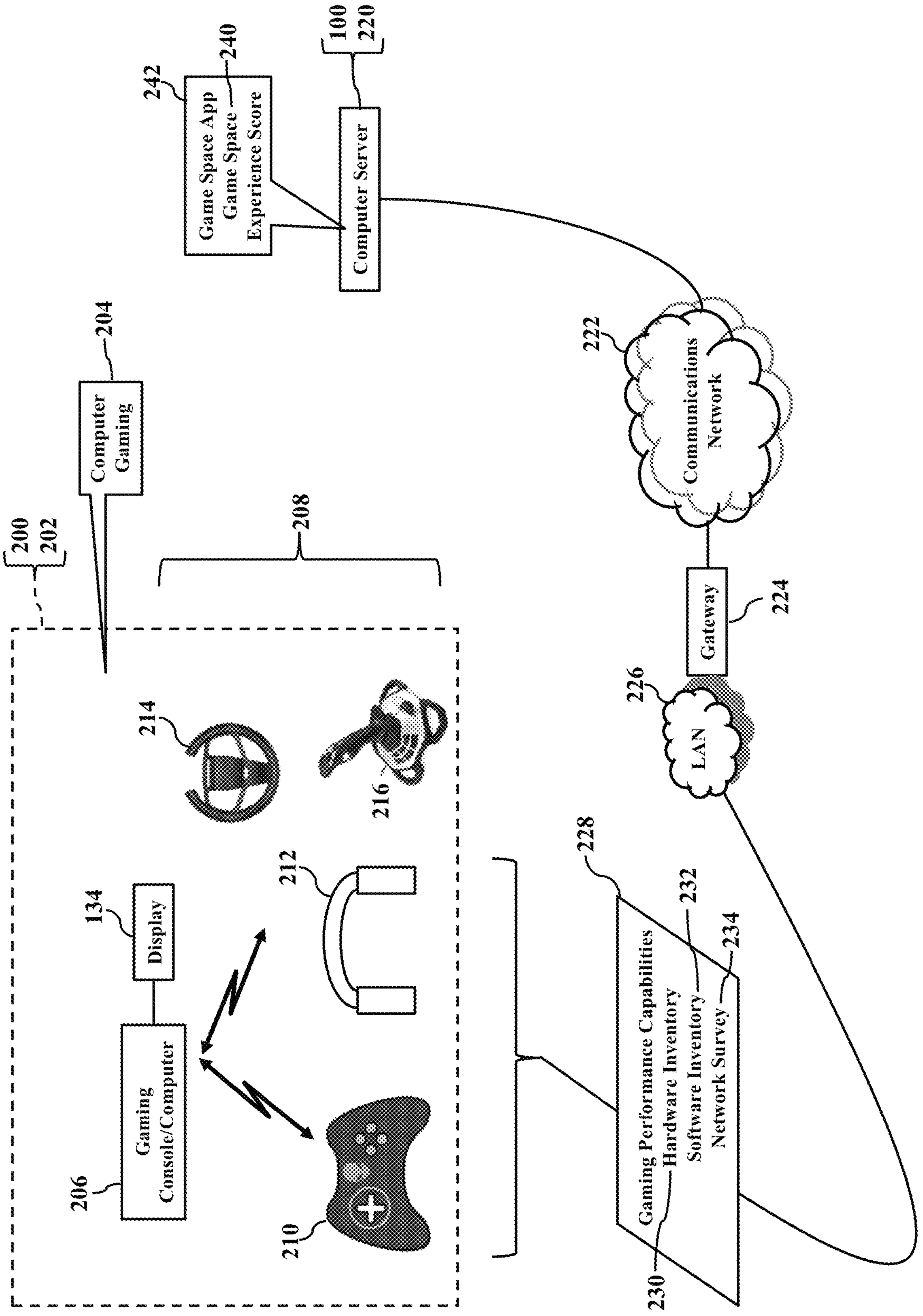
FIG. 2 illustrates characterization of game spaces, according to exemplary embodiments.

FIG. 2 illustrates the information handling system 100 characterizing a game space 200, according to exemplary embodiments. The game space 200 is any computer hardware and networking installation or environment 202 that executes, or can be used for, computer gaming 204. The game space 200 is thus represented by any electronic device and its network connection (such as wired DSL/cable/fiber and/or wireless radio/cellular/WI-FI®/BLUETOOTH®/electromagnetic reception range provided by the network interface 180 illustrated in FIG. 1). The game space 200 is not defined by physical rooms and walls. While the game space 200 may have many devices and networks, FIG. 2 illustrates the gaming components thought familiar to most readers. For example, the game space 200 may have a gaming console or computer 206 connected to peripheral devices 208 (such as the video display device 134, a wireless controller 210, a headset 212, a steering wheel 214, and a joystick 216).

FIG. 2 further illustrates the information handling system 100 as a computer server 220 that characterizes the game space 200. That is, the computer server 220 communicates with the gaming console or computer 206 and/or with the peripheral devices 208 via a communications network 222. The computer server 220 may further interface with a wired/wireless network gateway 224. The network gateway 224 provides network access to an Internet Service Provider ("ISP") and also provides a wired/wireless local area network (or "LAN") 226 serving the game space 200. The computer server 220 surveys, inventories, or rates any gaming performance capabilities 228 that are relevant or desirable for the computer gaming 204 executed by the game space 200.

The game space 200 is performance evaluated. The computer server 220 estimates or infers the computer functioning performance of the game space 200 when used for computer gaming 204. As a simple example, the computer server 220 may request or retrieve a hardware inventory 230, a software inventory 232, and a network survey 234 associated with the game space 200. The hardware inventory 230 determines or measures processor speeds, memory sizes, graphics capabilities, screen resolutions, and any other specifications associated with the gaming console or computer 206 and/or with the peripheral devices 208. The software inventory 232 identifies any or all software applications and versions installed on the gaming console or computer 206 and/or the peripheral devices 208. The network survey 234 determines what wired and wireless networks are available to the gaming console or computer 206 and/or to the peripheral devices 208, perhaps including measures of bandwidth/speed, signal strength, signal range, noise, channels, interference, loss, attenuation, and any other network performance criterion. Any devices or peripherals, for example, may be instructed to receive radio signals (perhaps streamed or broadcast by the network gateway 224) and conduct the network survey 234 using the radio signals.

The game space 200 may be scored or ranked. Once the gaming performance capabilities 228 (such as the hardware inventory 230, the software inventory 232, and the network survey 234) are received, the computer server 220 may generate a game space experience score 240. The computer server 220 may store and execute a game space application 242 having computer instructions or code that compute the game space experience score 240, based on the gaming performance capabilities 228 received from the game space 200. The game space experience score 240, in general, may be one or more numerical values, numerical ranges, letter grades, or other measures that singularly or compositely characterize or rate the game space 200 for the computer gaming 204.

The computer server 220 may assign or determine a high game space experience score 240 when the game space 200 is highly competitive for computer gaming 204. The computer server 220, however, may assign or determine a low game space experience score 240 when the game space 200 is uncompetitive for computer gaming 204. The gaming console/computer 206 and the peripheral devices 208, for example, may have high gaming performance capabilities 228 and may thus be highly competitive to compete, and perhaps win, the computer gaming 204. The computer server 220 may alternatively determine that the gaming console or computer 206 is individually highly competitive for computer gaming 204 (perhaps based on the hardware inventory 230 and its wired fiber network connection), but the wireless controller 210 is outdated and has poor/old radio performance (perhaps as revealed by the network survey 234). The overall, composite game space experience score 240 may thus have a lower overall or composite grade or value reflecting reduced gaming performance capabilities 228.

Figure 3:
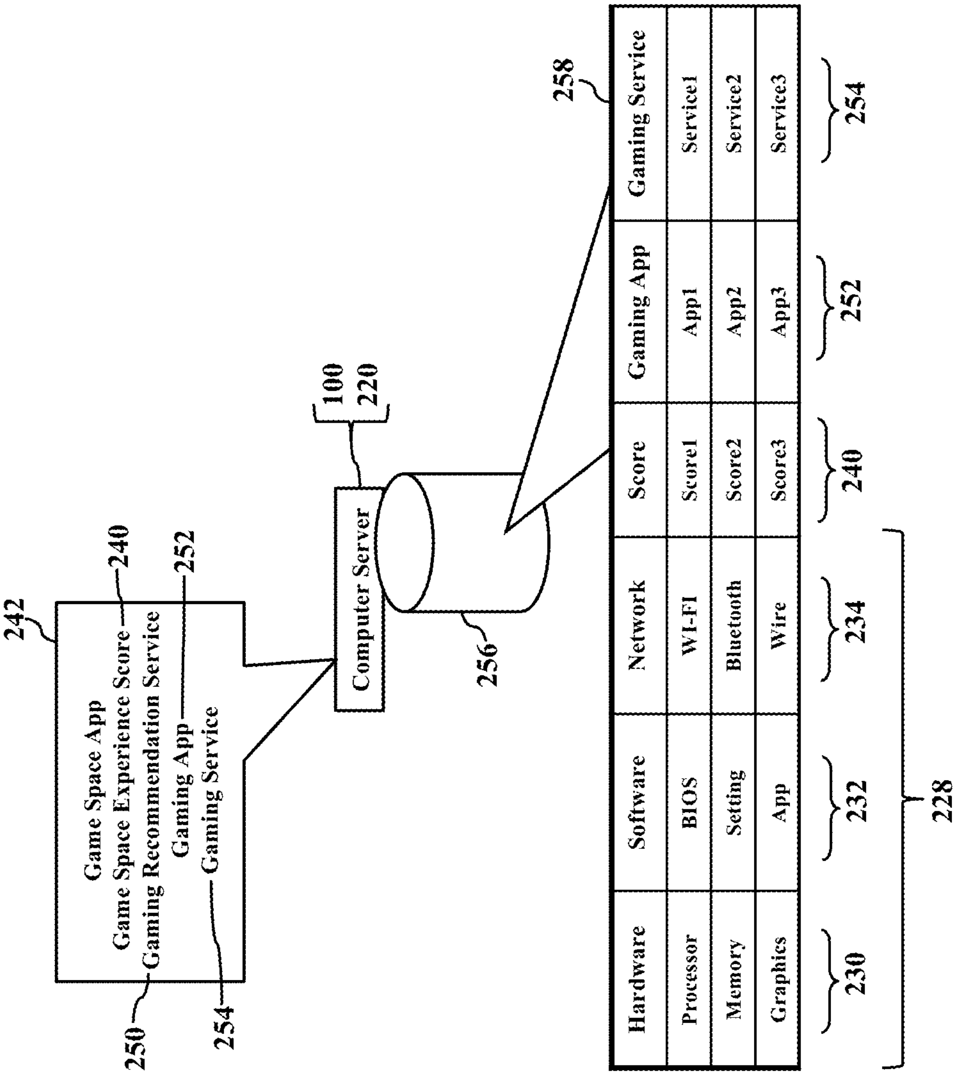
FIGS. 3-4 illustrate a gaming recommendation service, according to exemplary embodiments.
Figure 4:
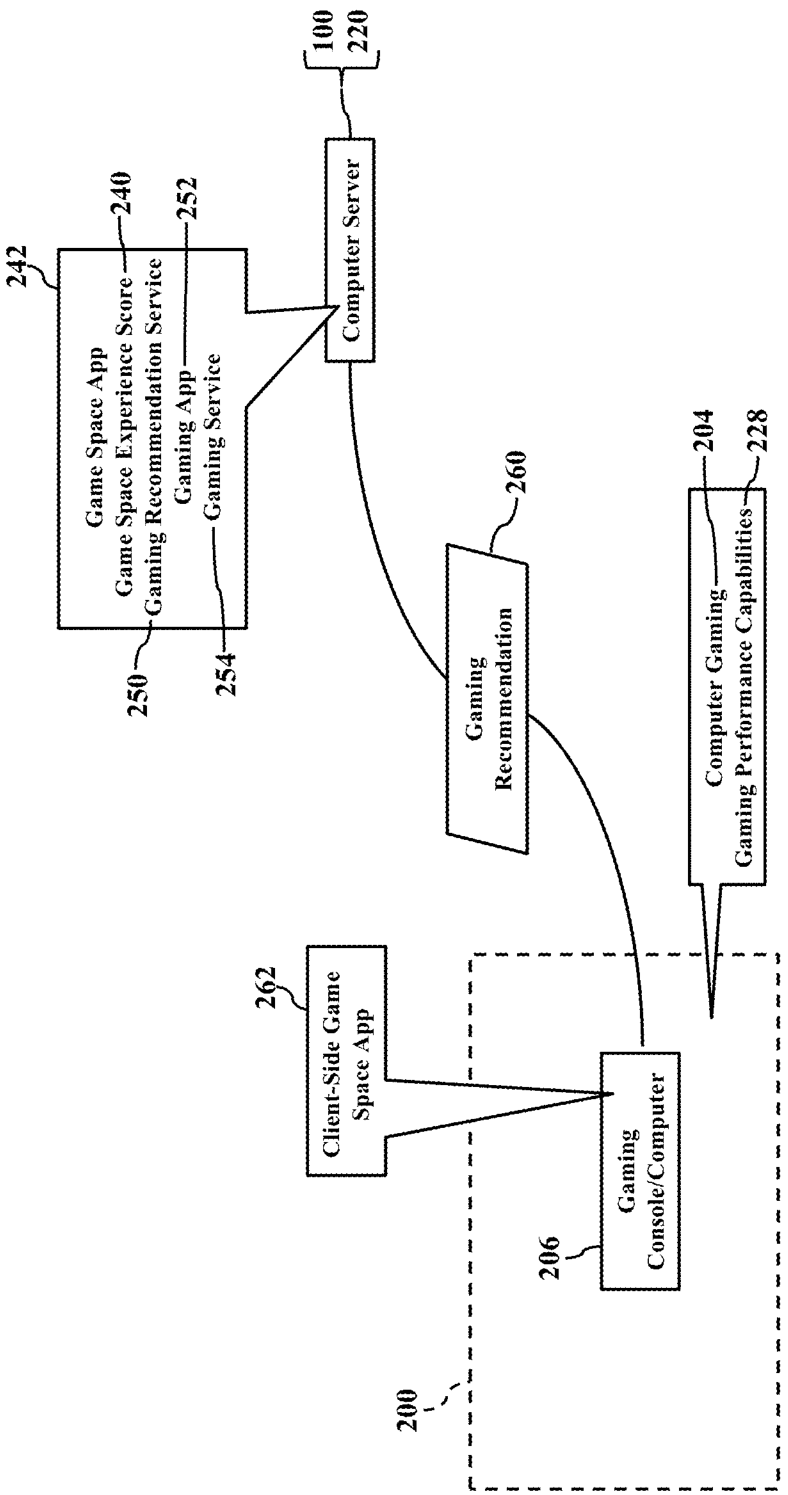

FIGS. 3-4 illustrate a gaming recommendation service 250, according to exemplary embodiments. Once the game space experience score 240 is generated, the computer server 220 may then perform the cloud-based gaming recommendation service 250 that recommends a gaming application 252 or gaming service 254 best suited to the game space 200. The computer server 220, for example, determines which gaming application 252 and/or which gaming service 254, is most likely favorable, or even winnable, given the gaming performance capabilities 228 associated with the game space 200.

The computer server 220, for example, may consult a gaming database 256. The gaming database 256 stores relationships between different gaming applications 252, different gaming services 254, and different game space experience scores 240. Once the game space experience score 240 is determined, the computer server 220 may query the gaming database 256 for the game space experience score 240 and identify/retrieve the corresponding gaming application 252 and/or gaming service 254. While the gaming database 256 may have any logical or physical structure, a relational database is perhaps easiest to understand. FIG. 3 thus illustrates the gaming database 256 as a locally-stored table 258 having columnar/row entries that associate, relate, or map the different gaming applications 252 and the different gaming services 254 to their corresponding game space experience scores 240. While only a few columnar/row entries are illustrated, in actual practice the gaming database 256 may have hundreds or thousands of entries detailing a rish repository of relationships. Once the game space experience score 240 is determined, the computer server 220 may perform a database lookup for the corresponding gaming application 252 and/or gaming service 254.

As FIG. 4 illustrates, gaming content may be recommended. Once the recommended gaming application 252 and/or gaming service 254 is identified, the computer server 220 may then generate and send a gaming recommendation 260. The gaming recommendation 260 describes the gaming application 252 and/or the gaming service 254 that is best suited to the gaming performance capabilities 228 associated with the game space 200, according to the game space experience score 240. While the gaming recommendation 260 may be sent/routed to any network destination, FIG. 4 illustrates the computer server 220 sending the gaming recommendation 260 to an Internet protocol address associated with the gaming console or computer 206. When the gaming console or computer 206 receives the gaming recommendation 260, the gaming console or computer 206 processes the gaming recommendation 260 as a message, notification, or alert. The gaming console or computer 206, for example, may locally store and execute a client-side game space application 262.

The client-side game space application 262 cooperates with the server-side game space application 242 to survey the game space 200, to acquire and send the gaming performance capabilities 228, and to process gaming events and activities, perhaps in a client/server relationship. The client-side game space application 262, in particular, may process the gaming recommendation 260 for visual display (such as by the display device 134 illustrated in FIGS. 1-2). The client-side game space application 262, in other words, may alert a gamer/user that the gaming application 252 and/or the gaming service 254 (identified by the gaming database 256) is best suited to the game space 200, given the gaming performance capabilities 228 associated with the gaming console or computer 206 and the peripheral devices 208 (such as the display device 134, the wireless controller 210, the headset 212, the steering wheel 214, and the joystick 216 illustrated in FIG. 2).

Figure 5:
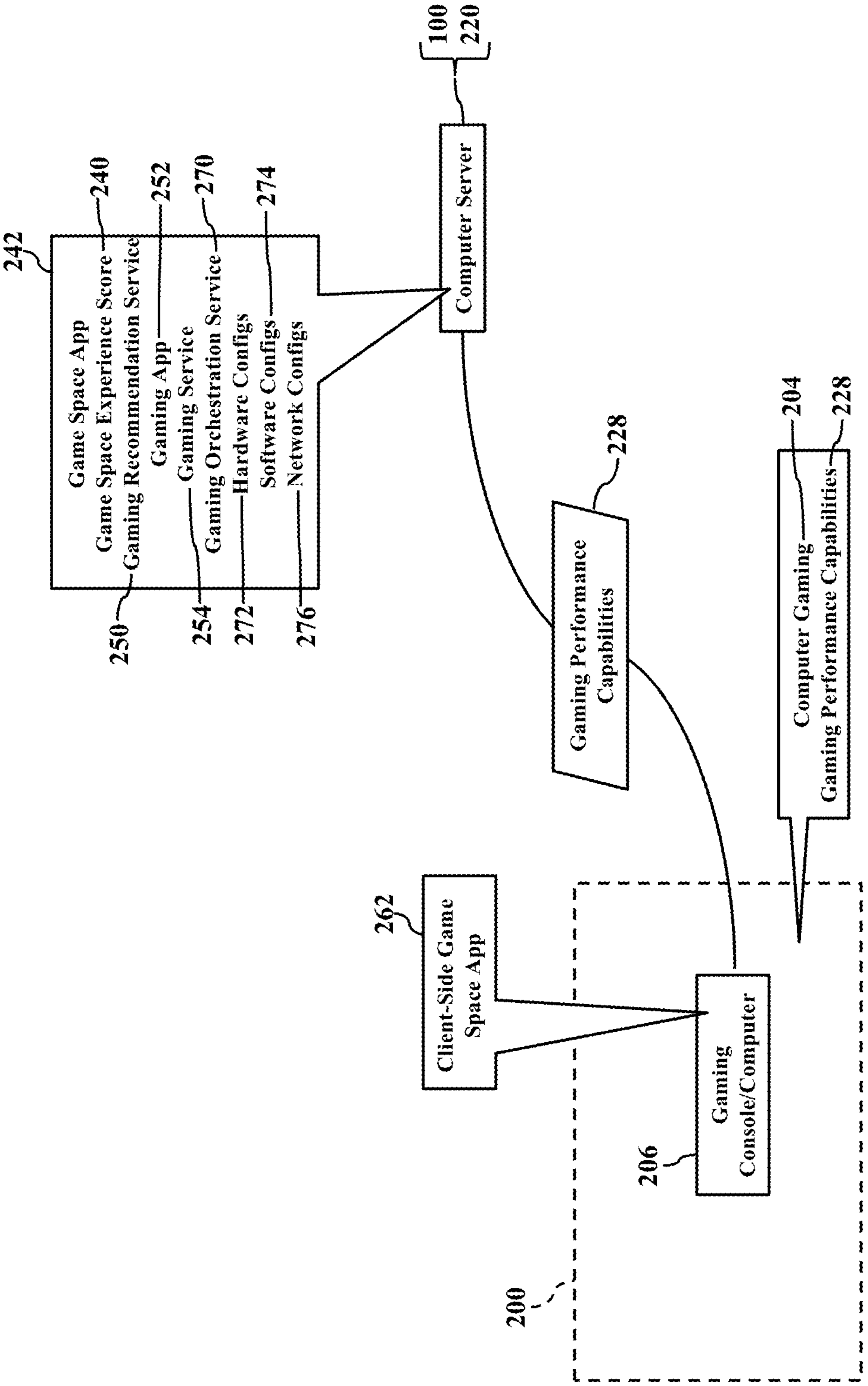
FIGS. 5-7 illustrate a gaming system orchestration service, according to exemplary embodiments.
Figure 6:
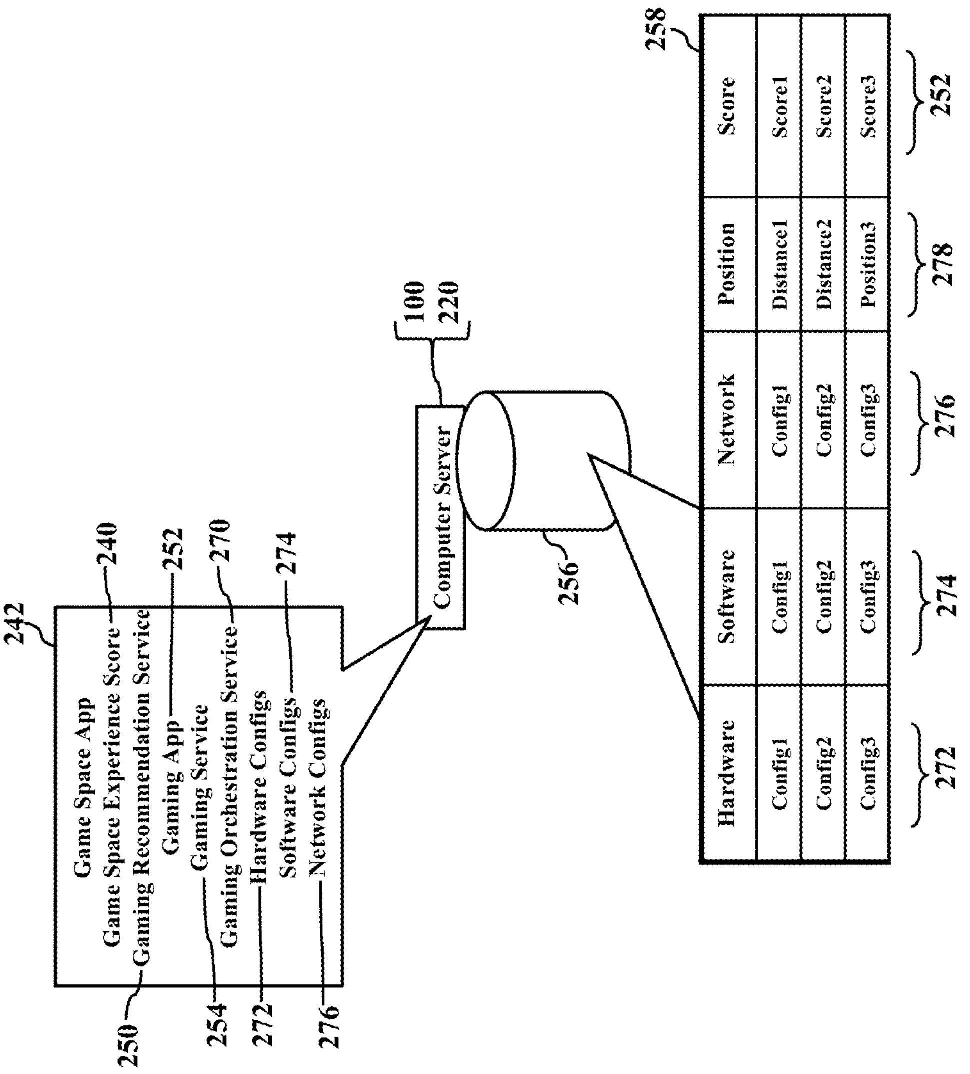
Figure 7:
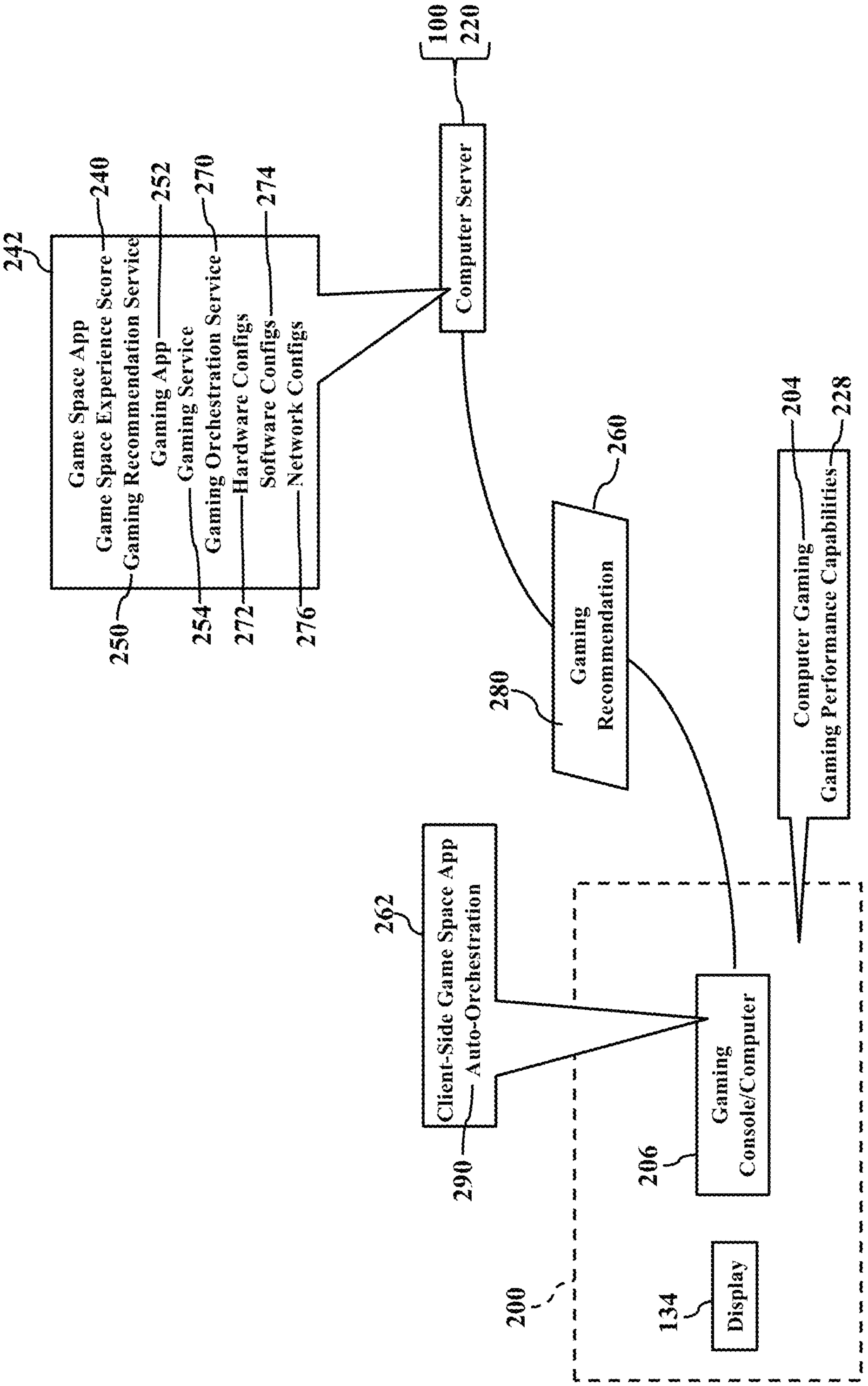

FIGS. 5-7 illustrate a gaming system orchestration service 270, according to exemplary embodiments. Once the gaming performance capabilities 228 are received, and perhaps the game space experience score 240 is generated, the computer server 220 may perform the gaming system orchestration service 270. The gaming system orchestration service 270 recommends hardware configurations 272, software configurations 274, and/or network configurations 276 that are best suited to the game space 200, given its gaming performance capabilities 228. The gaming system orchestration service 270, in other words, determines selections, settings, and parameters that maximize the computer functioning of the game space 200 when executing the gaming application 252 and/or the gaming service 254.

As FIG. 6 illustrates, the computer server 220 may consult the gaming database 256. Here the gaming database 256 may additionally or alternative store relationships between different hardware configurations 272, different software configurations 274, different network configurations 276, and/or even different locations/positions 278 (about or within the local area network 226 illustrated in FIG. 2) and different game space experience scores 240. So, once the gaming performance capabilities 228 (illustrated in FIG. 3) and/or the game space experience score 240 is determined, the computer server 220 may query the gaming database 256 and identify/retrieve the corresponding gaming selections, settings, configuration, values, and even the location/position 278 that maximizes the computer functioning of the game space 200. The computer server 220 may thus perform a database lookup for optimal configurations that maximize the computer functioning of the game space 200.

FIG. 7 illustrates gaming system recommendations. Once the gaming hardware configurations 272, software configurations 274, network configurations 276 and/or location/position 278 are determined (identified via the gaming database 256 illustrated in FIG. 6), the computer server 220 may then recommend a gaming system orchestration 280 that is best suited to the game space 200 and/or the preferred gaming application 252 and/or the gaming service 254. The gaming system orchestration 280 describes a composite hardware and software system configuration that is most likely favorable, or perhaps even winnable, given the gaming performance capabilities 228 associated with the game space 200. Even though the gaming system orchestration 280 may be sent/routed to any network notification address, FIG. 5 again illustrates the gaming console or computer 206. When the gaming console or computer 206 receives the gaming system orchestration 280, the gaming console or computer 206 processes the gaming system orchestration 280 as a message, notification, or alert. The client-side game space application 262 instructs or causes the gaming console or computer 206 to process the gaming system orchestration 280 as a visual notification for output by the display device 134. The client-side game space application 262 thus alerts the gamer/user that the game space 200 has improved, or even best, computer functioning when operating according to the predetermined/predefined gaming system orchestration 280.

The gaming system orchestration service 270 may also provide an auto-orchestration mechanism 290. When the gaming console or computer 206 receives the gaming system orchestration 280, the client-side game space application 262 may be configured to automatically implement the gaming system orchestration 280. The client-side game space application 262, for example, may instruct or cause the gaming console or computer 206 to packet inspect any messages representing the gaming system orchestration 280 and read their payload contents describing the gaming hardware configurations 272, software configurations 274, network configurations 276 and/or location/position 278. The client-side game space application 262 may then auto-install or auto-configure the gaming system orchestration 280. The client-side game space application 262 may also autonomously change any BIOS, parameter, setting, network port, resolution, color, or other value according to the gaming system orchestration 280. Exemplary embodiments, in plain words, may thus automatically configure the game space 200 for the best system performance, network performance, and more computer functioning when executing/playing/experiencing the computer gaming 204.

Figure 8:
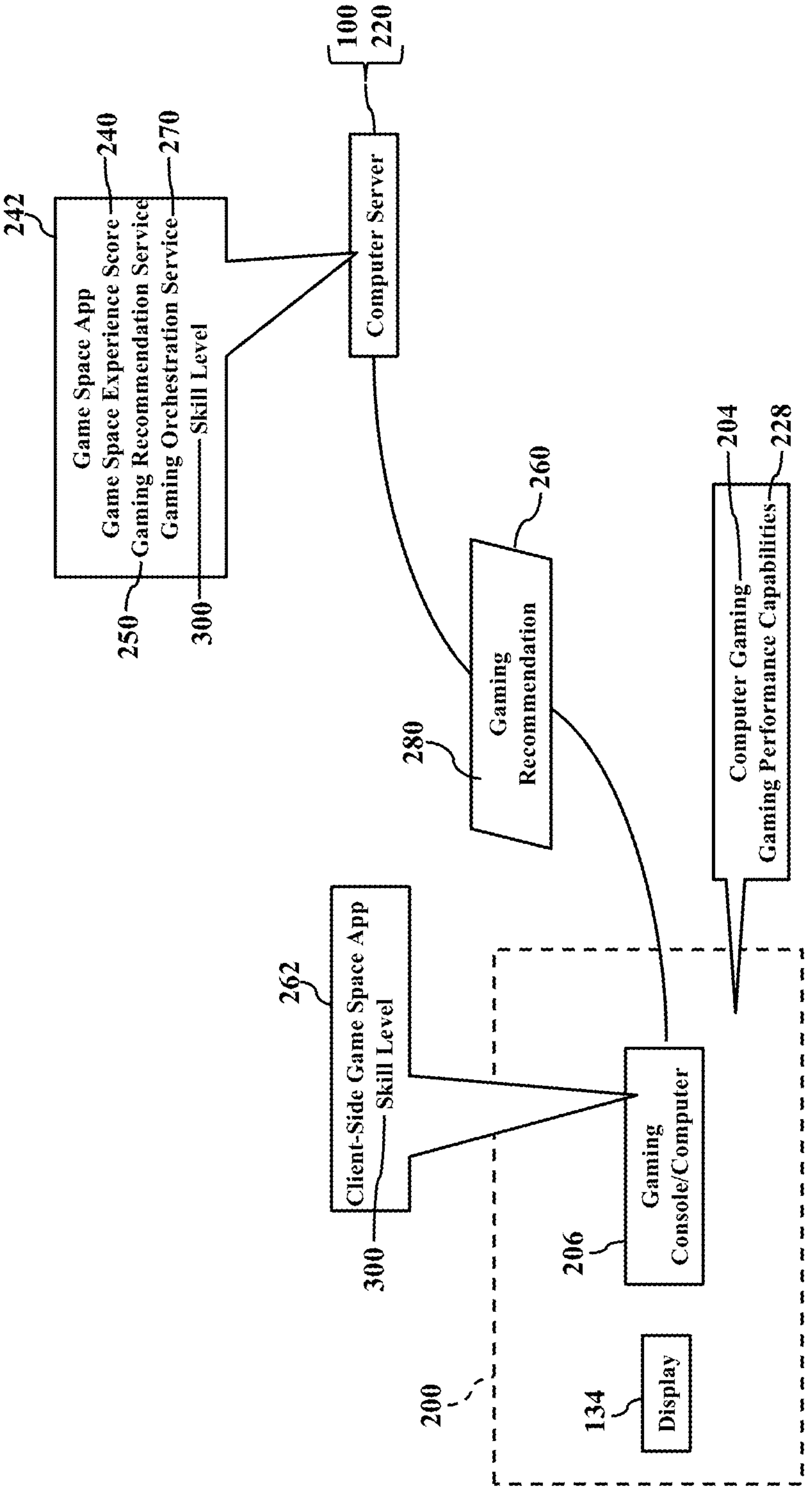
FIGS. 8-9 illustrate gamer skill, according to exemplary embodiments.
Figure 9:
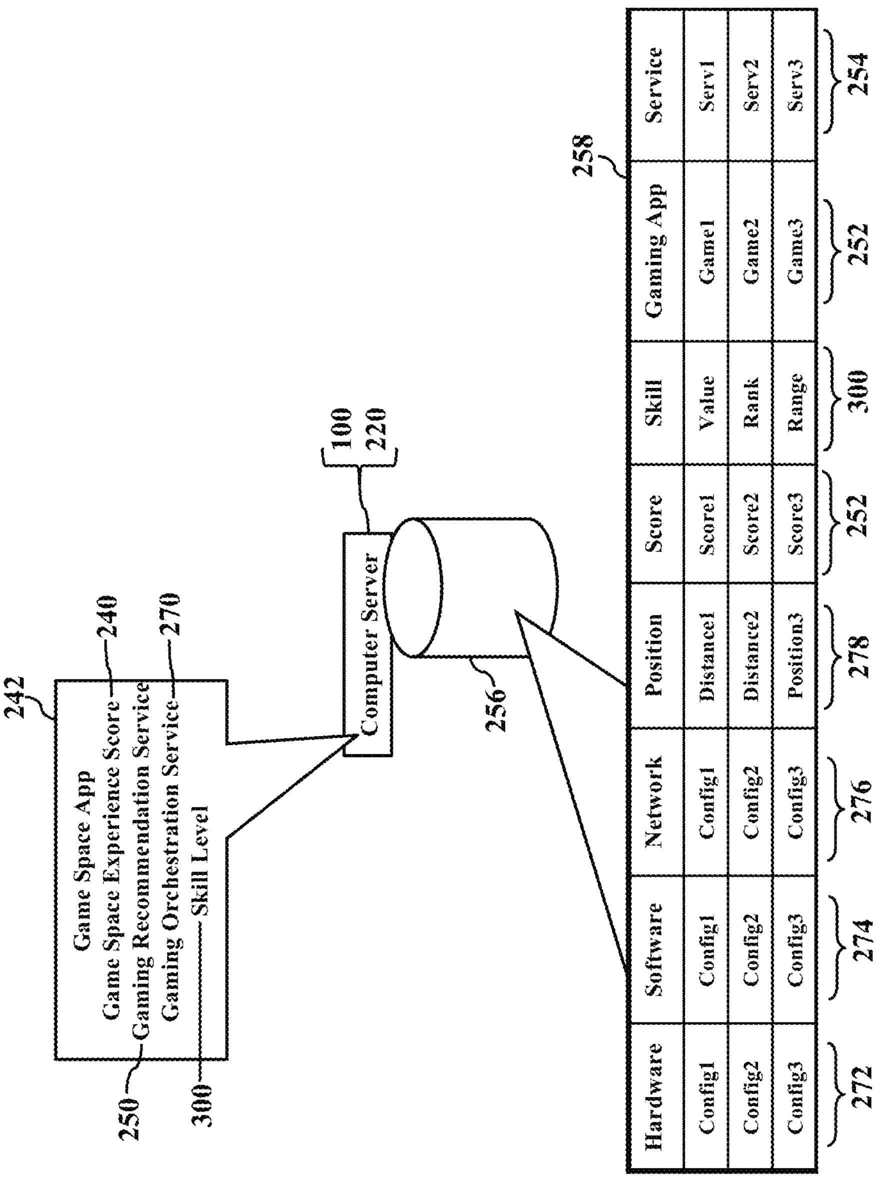

FIGS. 8-9 illustrates gamer skill, according to exemplary embodiments. Exemplary embodiments may also consider the gamer's skill level 300 when providing the gaming recommendation service 250 and the gaming system orchestration service 270. As the reader likely understands, a novice/beginner gamer is unlikely to harness the full performance potential of the game space 200. Computer gaming 204 often requires great skill acquired through repetitive play, especially in highly-competitive online/group play. A high-performance gaming device, in the hands of a novice, likely has reduced computer functioning and may be unlikely to win. Exemplary embodiments may thus personally identify the gamer/user and evaluate/rate the gamer's skill level 300. The gamer's skill level 300 may then be used to further refine the gaming recommendation service 250 and the gaming system orchestration service 270.

The gamer may be identified by login name/password, biometric, or other credential. Once the gamer/user is identified, exemplary embodiments may access historical gaming records associated with the gamer and with the game space 200. The gaming recommendation service 250 and the gaming system orchestration service 270, in other words, may query a repository of each computer game played by the gamer, his/her score/outcome/result/level, and the gaming device used to play the computer game. The gaming recommendation service 250 and the gaming system orchestration service 270 may then use these historical gaming records to assign or to determine the gamer's skill level 300 for a particular computer game played on a particular game device.

FIG. 9 illustrates the gaming database 256. The gaming database 256 may additionally or alternative store relationships between different gaming hardware configurations 272, software configurations 274, network configurations 276 and/or location/position 278, different game space experience scores 252, and different skill levels 300. So, once the gaming performance capabilities 228 (illustrated in FIG. 3), the game space experience score 240, and/or the gamer's skill level 300 are determined, the computer server 220 may query the gaming database 256 and identify/retrieve the corresponding database entries. The gamer's skill level 300 may thus affect the recommended gaming application 252 and/or the gaming service 254 and/or the gaming hardware configurations 272, software configurations 274, network configurations 276 and/or location/position 278.

Exemplary embodiments thus improve computer functioning. Gamers are constantly looking for features and solutions that give them a competitive edge when playing against others, whether in online or multi-player gaming scenarios. These competitive edges may obviously include acquiring new skills or tactics. However, exemplary embodiments actually improve computer functioning by identifying, and even auto-adjusting, game settings and hardware/software/network configurations that produce the best game space experience score 240. Exemplary embodiments leverage hardware/software/network information about the gamer's environment to optimize the experience for each game. Exemplary embodiments may even determine the best/optimum location/position (perhaps with respect to the LAN 226 (broadcast by the network gateway 224, as FIG. 2 illustrates) to achieve the best radio reception to generate the best game space experience score 240. Exemplary embodiments thus ensure that the hardware/software/network configurations provide the best computer functioning for computer gaming 204.

Exemplary embodiments further improve computer functioning. Exemplary embodiments intelligently characterize any game space 200. As the reader may understand, many hardware, software, and network elements may affect computer performance in computer gaming 204. Elements such as device specifications, available peripherals, location and positioning information, and game performance characteristics may each differently impact computer gaming 204. Exemplary embodiments tackle these complex problems by enumerating and estimating the impact of these elements and aggregating to generate the game space experience score 240. Exemplary embodiments then use this score to compose the optimal set of hardware/software/network elements within the game space 200 to ensure the best computer functioning.

Figure 10:
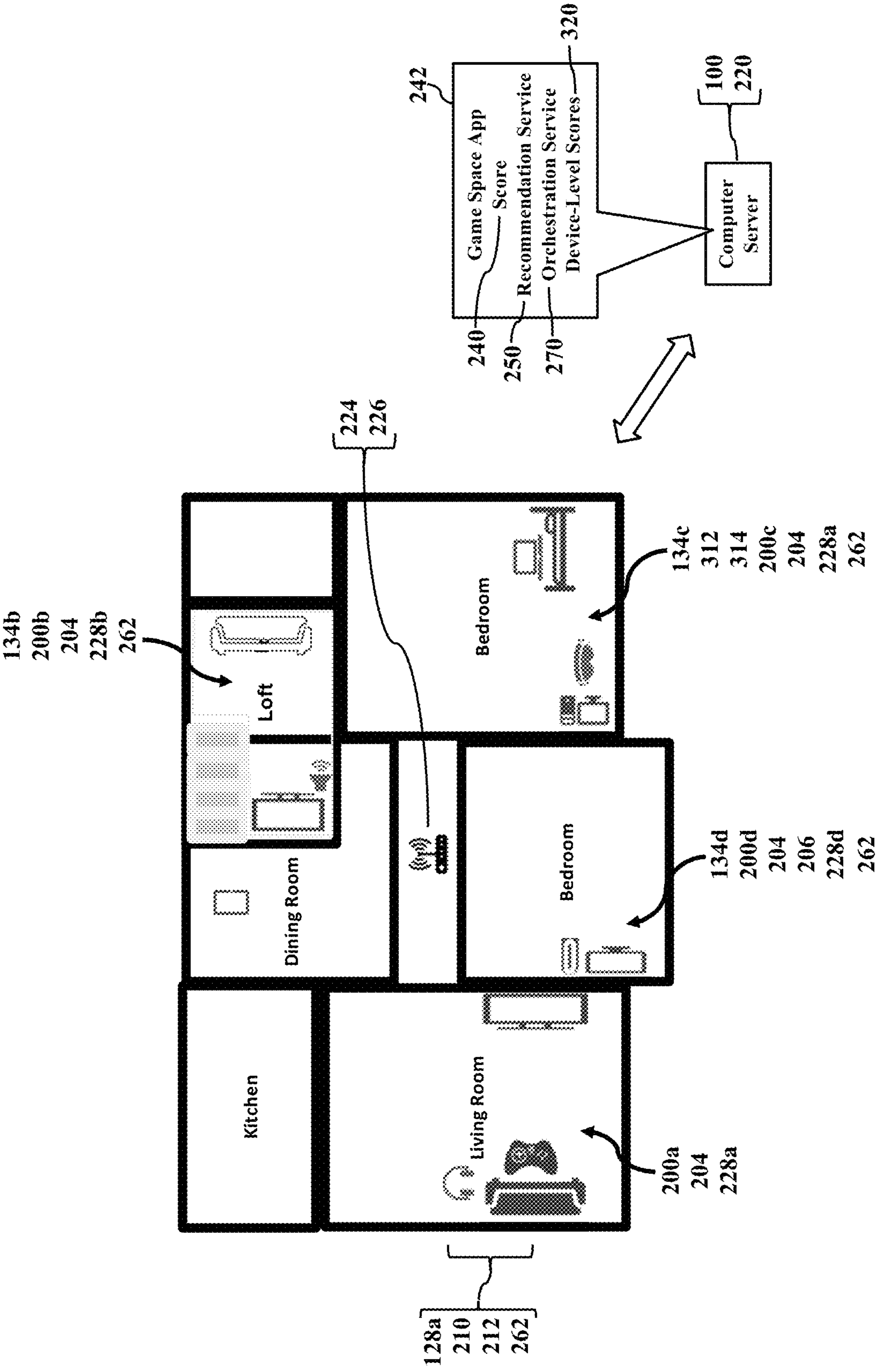
FIGS. 10-12 illustrate gaming system orchestration in multiple game spaces, according to exemplary embodiments.
Figure 11:
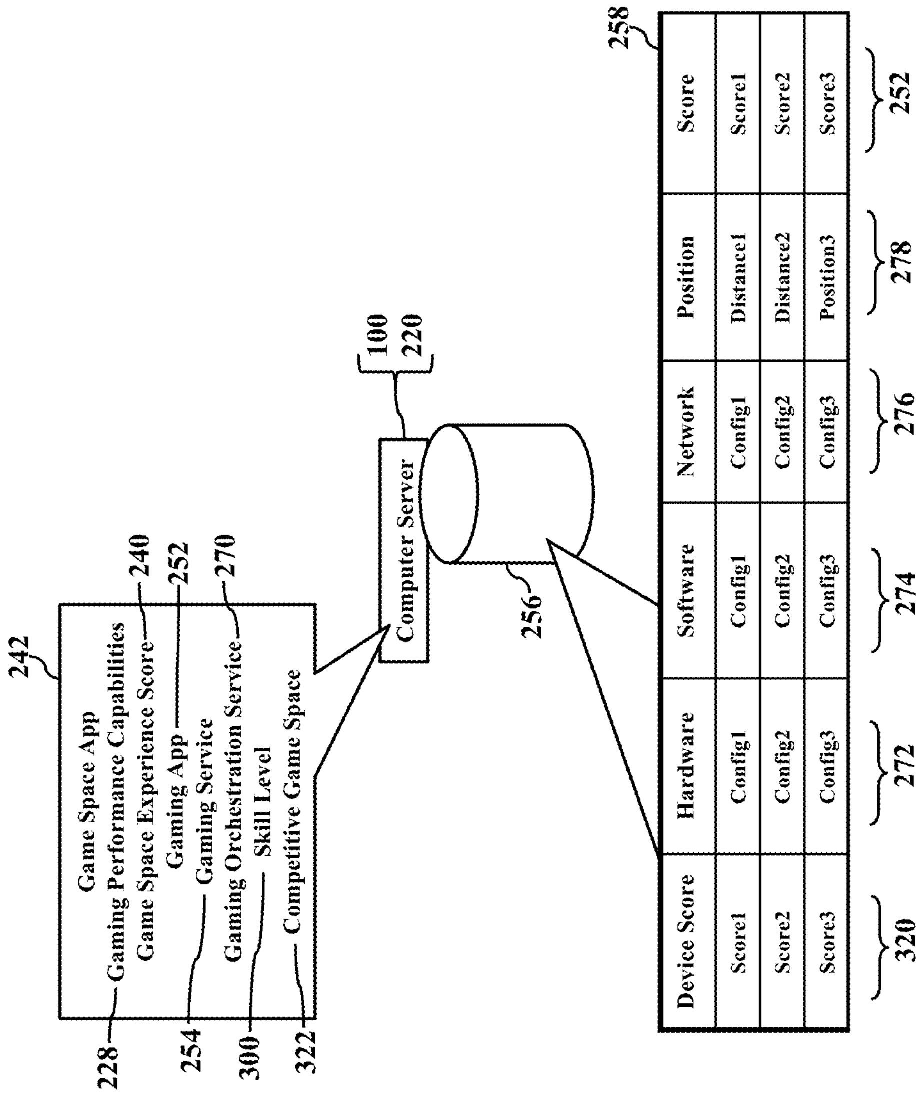
Figure 12:
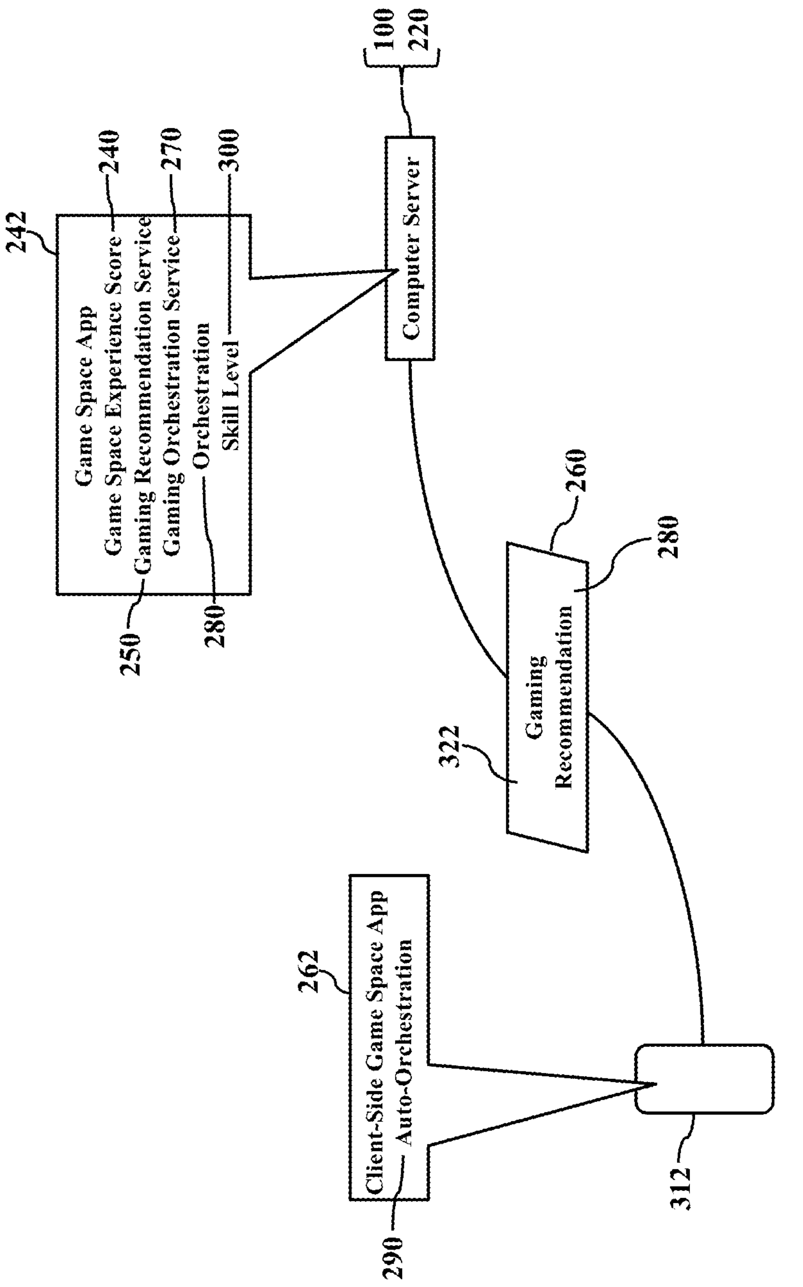

FIGS. 10-12 illustrate gaming system orchestration in multiple game spaces 200, according to exemplary embodiments. The above disclosure mainly explains gaming system optimization for a simple, and single, game space 200. As the reader may realize, though, many homes and businesses have multiple computer devices, perhaps in multiple rooms or areas, and perhaps utilizing different networks, that may serve as additional gaming environments. It's not unusual, for example, for a home to have multiple gamers (such as mom, dad, and kids), multiple LAN networks 226 (such as upstairs/downstairs or parent/child WI-FI® networks), and multiple gaming devices (such game consoles, tablet/laptop computers, smartphones). FIG. 10 thus illustrates a typical residential home 310 having multiple game spaces 200*a*-4. As the reader likely understands, the gateway 224 broadcasts the local area network ("LAN") 226 throughout the home 310.

A first display 134*a* (such as a smart television), the controller 210, and the headphones 212 (such as located in a living room) connect to the LAN 226 and are sometimes used for computer gaming 204 as game space 200*a*. Another display 134*b* (such as another smart television) and speakers (such as located in a loft) connect to the LAN 226 and are sometimes used for computer gaming 204 as game space 200*b*. Another display 134*c*, a smartphone 312, and smart vision goggles 314 (such as located in a bedroom) connect to the LAN 226 and are sometimes used for computer gaming 204 as game space 200*c*. Another display 134*d* and the gaming console or computer 206 (such as located in another bedroom) connect to the LAN 226 and are sometimes used for computer gaming 204 as game space 200*d*. The computer server 220 may communicate with any or all of these gaming devices/peripherals via the network gateway 224 and the communications network(s) 222 (illustrated in FIG. 2).

The computer server 220 characterizes each game space 200*a-c*. The computer server 220 queries any of the gaming devices comprising each game space 200*a-d* for its corresponding gaming performance capabilities 228*a-d* (such as the hardware inventory 230, the software inventory 232, and the network survey 234 above explained). Any device affiliated with the game spaces 200*a-d* may locally store and execute the client-side game space application 262. The client-side game space application 262 retrieves or determines the gaming performance capabilities 228*a-d* associated with the game space 200*a-d*. The client-side game space application 262 may then upload, report, or send the gaming performance capabilities 228*a-d* to the computer server 220. The computer server 220, executing the server-side game space application 242, generates each corresponding game space experience score 240*a-d* associated with each game space 200*a-d*, based on the corresponding gaming performance capabilities 228*a-d*.

Exemplary embodiments may also characterize each gaming device. The computer server 220 may also generate an individual device-level gaming scores 320 for each gaming device/component in each game space 200*a-d*. The individual device-level gaming score 320 characterizes or scores an individual device in the game space 200 for the computer gaming 204. The individual device-level gaming score 320, in other words, rates the individual gaming performance capabilities 228 associated with each gaming device in each game space 200. Because many of the gaming devices (such as the display 128, the peripheral wireless controller 210, the headset 212, the steering wheel 214, and the joystick 216 illustrated in FIG. 2) may be carried/moved and mixed/matched between the different game spaces 200*a-d*, exemplary embodiments may determine the individual device-level gaming scores 320 for each gaming device in each game space 200*a-d*.

The overall game space experience score 240 may thus be any combination of the individual device-level gaming scores 320. While exemplary embodiments may use the individual device-level gaming scores 320 in any way to generate the overall game space experience score 240, a mathematical average is perhaps easiest to understand. That is, the individual device-level gaming scores 320 may be summed and averaged to determine the overall game space experience score 240. Simple averaging thus assumes that no one gaming device in the game space 200 is more important, or more effective, than any other. A weighted average, of course, would assume that one of the gaming devices in the game space 200 is more influential and thus has a greater weight. Some gaming devices, in other words, have a greater competitive impact, so those impactful gaming devices may have a greater contribution to the overall game space experience score 240.

FIGS. 11-12 further illustrate the gaming system orchestration service 270. Once the individual device-level gaming scores 320 are determined, exemplary embodiments may pick-and-choose which combination of the gaming devices would generate the highest/best overall game space experience score 240. The computer server 200 may again query the gaming database 256 for predetermined/preconfigured combinations and configurations. The computer server 200 inventories all the gaming components/devices/peripherals in the all the game spaces 200. The computer server 220 may then consult the gaming database 256 and machine-select which of the gaming components/devices/peripherals produces the most/best computer functioning for computer gaming 204. Exemplary embodiments, in other words, may generate a most-competitive game space 322 that yields the greatest/highest gaming performance capabilities 228. The computer server 220 evaluates the inventories and surveys 230, 232, and 234 (all explained with reference to FIG. 3), the radio positions 278, and/or the individual device-level gaming scores 320 to determine which combination of gaming devices and networks yields the highest-ranked overall game space experience score 240. The gaming system orchestration service 270 determines which combination of the gamer's different devices and networks yields the best computer functioning for computer gaming 204. In plain words, the gaming system orchestration service 270 selects which combination of the gamer's components/devices/peripherals is most likely to win in computer gaming 204, such as given the gamer's skill level 300.

The gaming system orchestration service 270 may also determine configurations. Once the most-competitive game space 322 is identified, the gaming system orchestration service 270 may further identify and retrieve the corresponding gaming hardware configurations 272, software configurations 274, network configurations 276 and/or locations/positions 278 that correspond to the most-competitive game space 322. Once this data is identified, this data may also be sent with, or to accompany, the gaming recommendation 260. So, not only may the gaming system orchestration service 270 determine the most-competitive game space 322, but the gaming system orchestration service 270 may also identify exactly how the most-competitive game space 322 is set-up, connected, and configured for best computer functioning at computer gaming 204.

FIG. 12 illustrates service notification(s). Once the most-competitive game space 322 is identified, the gaming system orchestration service 270 may notify the gamer. The computer server 220, for example, may generate and send the gaming recommendation 260. Here the gaming recommendation 260 specifies or includes content describing the combination of gaming devices and networks that produces the most-competitive game space 322 having the greatest gaming performance capabilities 228. Again, while the gaming recommendation 260 may be sent/routed to any network destination, FIG. 12 illustrates the gaming recommendation 260 routing to the gamer's mobile smartphone 312. The gaming recommendation 260 may specify the gaming system orchestration 280 representing the most-competitive game space 322. When the smartphone 312 receives the gaming recommendation 260, the smartphone 312 processes the gaming recommendation 260 for display, such as a text message. Regardless, the gaming recommendation 260 identifies which of the gamer's devices and networks should be connected/paired for the most-competitive game space 322

The gaming system orchestration service 270 may also provide the auto-orchestration mechanism 290. Once the most-competitive game space 322 is identified, the gaming system orchestration service 270 may further automatically implement the corresponding gaming system orchestration 280. Once any of the gamer's components/devices/peripherals is notified of the most-competitive game space 322, the gaming system orchestration 280 may be distributed to the individual devices composing the most-competitive game space 322. The gamer's smartphone 312, for example, may send/forward the gaming system orchestration 280 to the IP addresses associated with the individual devices composing the most-competitive game space 322. The computer server 220, additionally or alternatively, may send the gaming system orchestration 280 to any network address or device operating in, or associated with, the most-competitive game space 322. The gaming system orchestration 280 defines or specifies the hardware, software, and network specifications that achieve the most-competitive game space 322. When the most-competitive game space 322 receives the gaming system orchestration 280, each corresponding client-side game space application 262 may auto-install or auto-configure. Exemplary embodiments may thus automatically identify and configure the most-competitive game space 322 for the best computer functioning for computer gaming 204.

Figure 13:
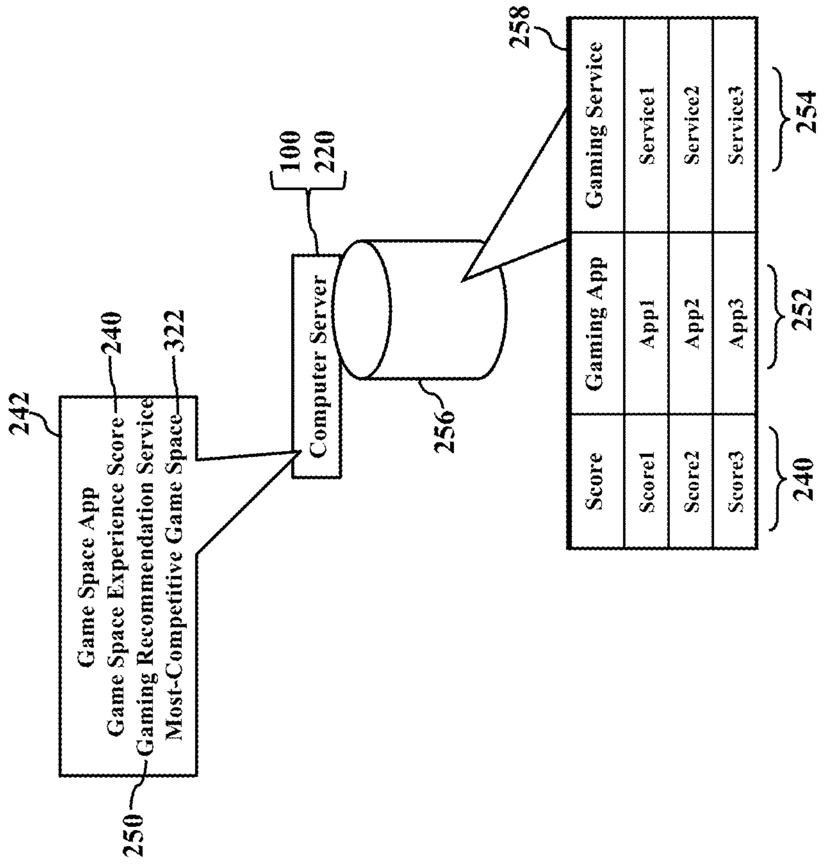
FIG. 13 further illustrates the gaming recommendation service, according to exemplary embodiments.

FIG. 13 further illustrate the gaming recommendation service 250, according to exemplary embodiments. Once the best computer functioning, most-competitive game space 322 is identified, the gaming recommendation service 250 may recommend which gaming application 252, or which gaming service 254, is best suited to the most-competitive game space 322. The computer server 220, in other words, determines which gaming content is most likely favorable, or even winnable, given the most-competitive game space 322. The computer server 220, for example, may query the gaming database 256 for the game space experience score 240 associated with the most-competitive game space 322 in the gamer's home or office. The gaming database 256 thus reveals the historical gaming records (such as the gaming application 252, or the gaming service 254) that has been historically, statistically, or predetermined to be best suited to the gaming performance capabilities 228 associated with the most-competitive game space 322. The computer server 220 may thus generate and send the gaming recommendation 260 as a competitive suggestion (as explained with reference to FIGS. 4-12).

Exemplary embodiments thus improve computer functioning. In multi-device, multi-player scenarios, computer gaming 204 is extraordinarily complex to configure for optimum computer functioning/performance. Exemplary embodiments identify the right/best composition of devices, peripherals, and such as even player(s) that yields the best gaming performance capabilities 228, as represented by the most-competitive game space 322 and the best overall game space experience score 240. Exemplary embodiments leverage hardware/software/network information about the gamer's devices, peripherals, and networks to optimize computer functioning for computer gaming 204. Exemplary embodiments may even determine the best/optimum location/position (such as with respect to the LAN 226 broadcast by the network gateway 224) to achieve the best radio reception and to again optimize computer functioning for computer gaming 204.

The gaming database 256 is a rich repository of gamers and their results. The gaming database 256 stores historical gaming records associated with each gamer and with the game space 200. The gaming database 256 reveals each computer game played by the gamer, his/her score/outcome/result/level, and the gaming devices used to play the computer game. Exemplary embodiments may then query access the gaming database 256 for any individual gamer's identity and retrieve the corresponding historical gaming records. These historical gaming records reveal repetitive game sessions logged/played and the corresponding scores/results. When any gamer's identity or device (such as a smartphone) is determined within any game space 200, exemplary embodiments may retrieve that particular gamer's gaming preferences and results. Exemplary embodiments may thus recommend gaming content that appeals to the gamer's profile. Exemplary embodiments may also configure and orchestrate the game spaces 200 to optimize gamer experiences throughout the home. Because the gaming database 256 stores historical gaming activities, exemplary embodiments may monitor/log gaming sessions and migrate the game sessions across the available game spaces 200 to optimize the household gaming experience.

Game spaces 200 and gaming content may be recommended. As gamers enter different game spaces 200, the network presences of their personal smartphones, watches, and other devices are detected. Exemplary embodiments may then query the gaming database 256 for their historical gaming profiles. Gaming content may then be recommended based on a variety of features, including devices and peripherals in use and available, game space 200 data, other gamers active in the home game spaces 200, and history of recommendations and decisions in similar gaming states. Indeed, because exemplary embodiments identify gamer presences in the game spaces 200 (such as by their respective smartphone network presences), exemplary embodiments may recommend that a particular group of gamers come together for group social gameplay sessions based on shared interests and party compatibility, as revealed by the gaming database 256. Gaming content may be predicted, such as based on location, the game spaces 200, other active home gamers, history, and game rank. Exemplary embodiments may recommend future gaming content, especially for a group of gamers detected within proximate game spaces 200.

A simple exemplary recommendation is provided. Exemplary embodiments identify the gamer, inventory/survey the game space 200, and may obtain the gamer's location/position within the game space 200. Exemplary embodiments may then query the gaming database 256 for the gamer's historical gaming profile. The gaming recommendation service 250 may recommend which gaming application 252, or which gaming service 254, is best suited to the gamer, perhaps using most-competitive game space 322.

Group computer gaming may also be recommended. Exemplary embodiments identify each gamer (such as based on network presences of the gamers' smartphones, watches, or other devices), inventory/survey the game spaces 200, and obtain the gamers' locations/positions within the game spaces 200. Exemplary embodiments may then query the gaming database 256 for their historical gaming profiles. Once all the gamers and the game spaces 200 are identified/characterized, the gaming recommendation service 250 may recommend which gaming application 252, or which gaming service 254, is best suited to the gamers for group play, perhaps using most-competitive game space 322. For example, gaming content may be recommended with a gaming ownership state is determined. The gaming ownership state may be determined when one of the gamer's is already online, so exemplary embodiments may recommend that the group join the same online game already in progress.

As another example, gaming ownership state may be determined when a state change event is determined (such as logging in, coming back from away, stopping game, in between matches). Based on ownership state, individual game rank components, friend scores, score of current session, expected current session completion is determined, perhaps using the gaming database 256. To join a particular game together (even if that game is currently being played by none of the gamers), recommendations may be implemented as a timed pop up notification on the screen, controller, or another device (such as a second screen or a text message to a gamer's phone/watch) as a vote to join if others are interested, a quick join/form of the party, a join after current match/session, a decline, or an alternate proposal (which may come from a recommendation) for the rest of the party to consider.

The gaming recommendation service 250 and the system orchestration service 270 may optimize the game spaces 200. On any gamer launch action, optimization directive, device state, or game mode change, the gaming recommendation service 250 and the system orchestration service 270 may execute. Each gamer, and even group games, may be scored/weighted according to any trait. For example, gamers have experience importance weights that are composed of gamer persona (which map to importance of render quality, input sensitivity, end to end latency sensitivity), service roles (owner, player, guest), and game criticality (competitive online, critical encounter, online multiplayer, online coop, local multiplayer, local coop, single player, creative, non-real time, input sensitivity score). A scoring algorithm may be:

$$\text{Home Experience Score} = \sum_{g}^{G} \text{Experience Importance Score}_g * \text{Game Experience Score}(g, \text{Game}_g, \text{Game Environment}_g)$$

(where g is a gamer, and G is the set of all active garners in the home).

Exemplary embodiments may compute the candidate Home Experience Scores from the combinations of gamers and game environments and orders the candidate configurations by its score, where each configuration maps each gamer to a game environment. If the recommended configuration is different than the current configuration, exemplary embodiments will act governed by a home policy threshold modifier (such as Aggressive, Default, Conservative) and a confidence mapper to what the action should be (auto launch and migrate, prompt for single optimal migration, show list of top recommended configurations, take no action, etc.). Historical actions (or inaction) (perhaps as revealed by the gaming database 256) are considered when comparing the proposed configurations against past events to increase or decrease the confidence of proposed actions. If one or more game migrations are needed to meet the selected configuration, then they are conducted ordered from lowest impact to highest impact (measured by time until playable weighted against experience importance score). Actions taken may include switching authenticated accounts that are active for one or more ecosystems in one or more game environments, exchanging data (including game environments, game files, and gamer data files) between devices/game environments, and stopping or starting physical or virtual devices and/or game environments (including cloud game environments). Migrations may also be deferred to non-impactful migration windows (such as at end of match session or during death or cooldown conditions).

Figure 14:
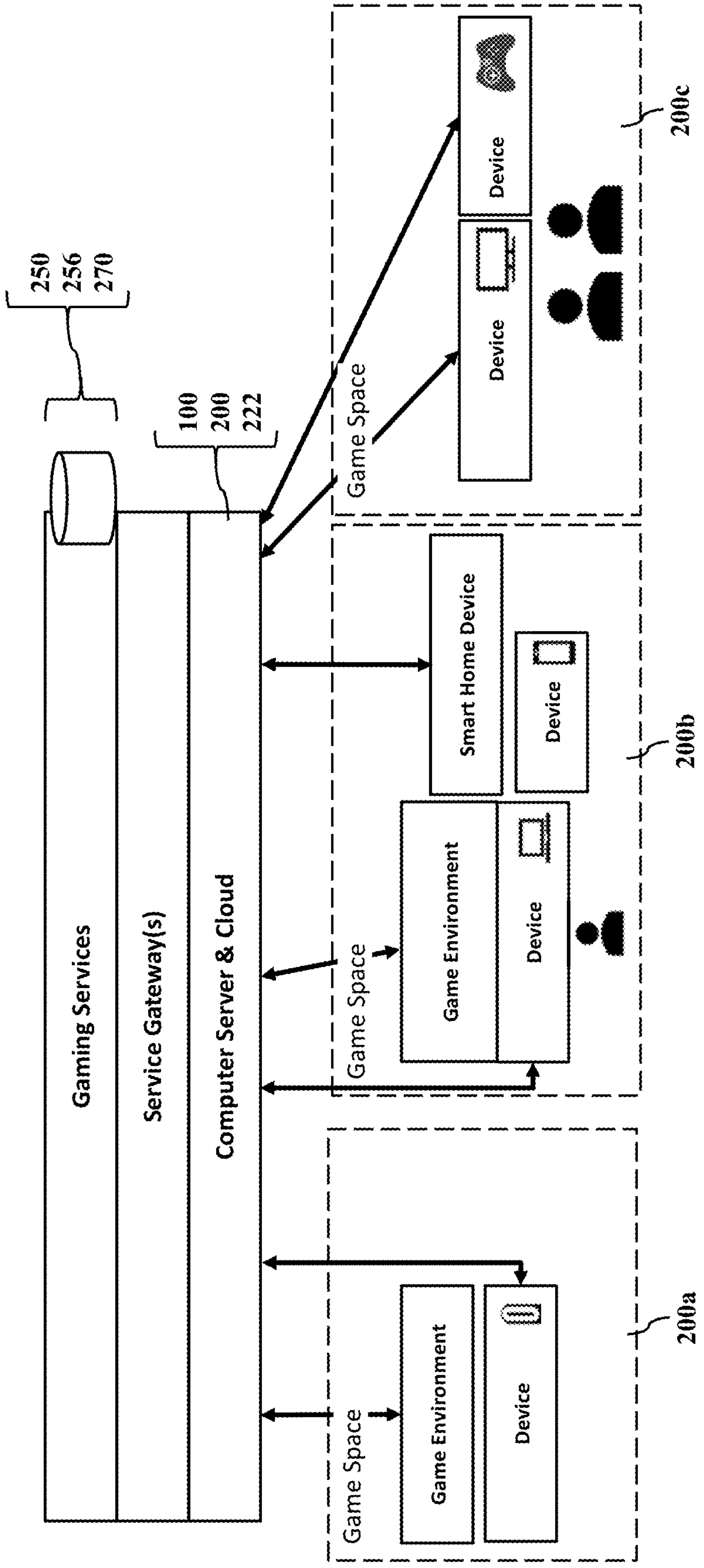
FIGS. 14-16 further illustrate the gaming recommendation service and the gaming system orchestration service, according to exemplary embodiments.
Figure 15:
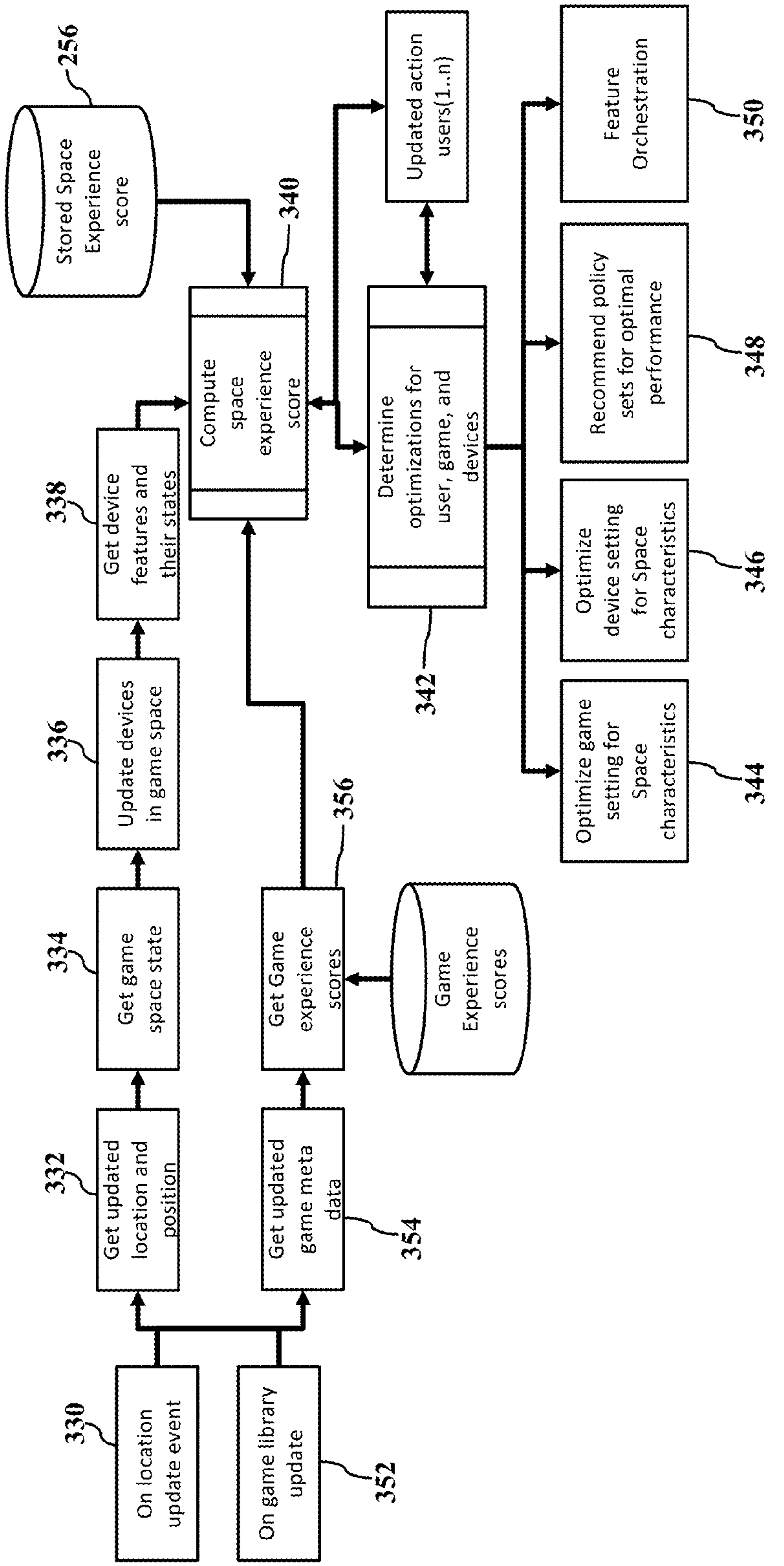
Figure 16:
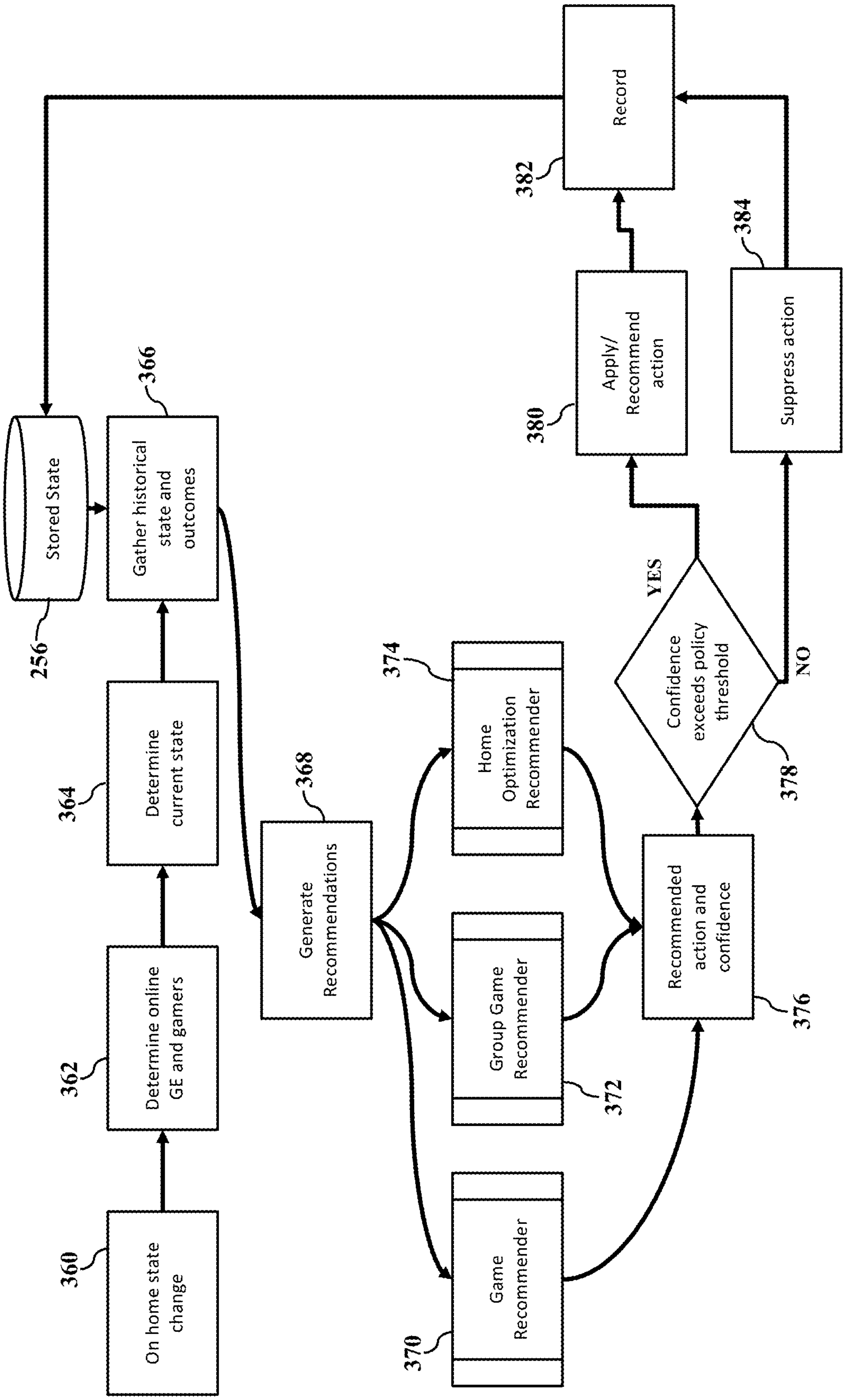

FIGS. 14-16 further illustrate the gaming recommendation service 250 and the gaming system orchestration service 270, according to exemplary embodiments. FIG. 14 illustrates an overall system architecture for providing the gaming system orchestration service 270 and the gaming recommendation service 250. FIGS. 15-16 illustrate a flowchart or algorithm, executed by the information handling system 100, that provides the gaming system orchestration service 270 and the gaming recommendation service 250. When a locational trigger (change event) occurs (Block 330), an updated physical/network position 278 is determined (Block 332), a gaming state is determined (Block 334), the inventories/surveys 230-234 are determined (Block 336), and the gaming performance capabilities 228 are identified (Block 338). The gaming database 256 is queried and the game space experience score 240 is determined (Block 340). The gaming recommendation service 250 determines the optimum/best computer functioning for computer gaming 204 (Block 342), and the gaming system orchestration service 270 orchestrates the optimum/best computer functioning for computer gaming 204 (Blocks 344-350).

Exemplary embodiments may also trigger in response to software changes. When a gaming application changes (Block 352), gaming data is obtained (Block 354), and historical gaming data/results/scores/skills are retrieved (Block 356). The gaming database 256 may again be queried and the game space experience score 240 is determined (Block 340).

The algorithmic flowchart continues with FIG. 16. A state change is detected associated with the game space 200 (Block 360). The current game experience ("GE") and gamer identities are determined (Block 362). The current state is determined (Block 364) and the historical data is retrieved (Block 366). The gaming recommendation service 250 generates the gaming recommendation(s) 260 (Block 368) recommends individual and/or group gaming content (Blocks 370 and 372), perhaps along with the game space 200 (such as the most-competitive game space 322) (Block 374). The system orchestration service 270 recommends the optimized the game space(s) 200 and determines one or more confidence levels associated with any recommendation (Block 376). The confidence levels may be compared to a configurable set of policies defining parameters for recommending or even auto-installing/executing actions. If the one or more confidence levels satisfy the set of policies (Block 378), then the system orchestration service 270 may recommend the actions and even auto-install/configure the recommendations (Block 380). Entries may then be added to the gaming database 256 that record the recommendations, policies, and the auto-install/configure operations (Block 382). If, however, the one or more confidence levels do not satisfy the policies (Block 378), then the system orchestration service 270 may suppress or deny any action (Block 384), but, still add entries to the gaming database 256 documenting or describing the rejected actions or recommendations (Block 382).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method associated with computer functioning for computer gaming, the method comprising:

receiving, by a processor of an information handling system, a hardware inventory generated by a game space, wherein the game space includes an electronic device and a network connection for the electronic device;

receiving a network survey generated by the game space, wherein the network survey includes measuring different network performance criterion of the network connection;

identifying a gaming configuration that corresponds to the hardware inventory and to the network survey generated by the game space;

generating a gaming recommendation that corresponds to the gaming configuration; and auto-installing, by the processor of the information handling system, the gaming configuration and the gaming recommendation to change the computer functioning of the game space for the computer gaming; and outputting, on a display device, a visual notification of the gaming system orchestration.

2. The method of claim 1, further comprising identifying historical gaming records that correspond to the game space.

3. The method of claim 1, further comprising scoring the game space.

4. The method of claim 1, further comprising scoring the hardware inventory.

5. The method of claim 1, further comprising scoring the network survey.

6. The method of claim 1, further comprising receiving a state generated by the game space.

7. The method of claim 6, further comprising generating the gaming recommendation based on the state generated by the game space.

8. A system associated with computer functioning for computer gaming, the system comprising:

a processor; and a memory device storing instructions that when executed by the processor perform operations, the operations including:

receiving, by the processor, a hardware inventory generated by a game space, wherein the game space includes an electronic device and a network connection for the electronic device;

receiving a network survey generated by the game space, wherein the network survey includes measuring different network performance criterion of the network connection;

generating a gaming recommendation that corresponds to the gaming configuration;

auto-installing, by the processor, the gaming configuration and the gaming recommendation to change the computer functioning of the game space for the computer gaming; and outputting, on a display device, a visual notification of the gaming system orchestration.

9. The system of claim 8, wherein the operations further include identifying historical gaming records that correspond to the game space.

10. The system of claim 8, wherein the operations further include scoring the game space.

11. The system of claim 8, wherein the operations further include scoring the hardware inventory.

12. The system of claim 8, wherein the operations further include scoring the network survey.

13. The system of claim 8, wherein the operations further include receiving a state generated by the game space.

14. The system of claim 13, wherein the operations further include generating the gaming recommendation based on the state generated by the game space.

15. A memory device storing instructions that when executed perform operations associated with computer functioning for computer gaming, the operations including:

receiving, by a processor of an information handling system, a hardware inventory generated by a game space, wherein the game space includes an electronic device and a network connection for the electronic device;

receiving a network survey generated by the game space, wherein the network survey includes measuring different network performance criterion of the network connection;

generating a gaming recommendation that corresponds to the gaming configuration;

auto-installing, by the processor of the information handling system, the gaming configuration and the gaming recommendation to change the computer functioning of the game space for the computer gaming; and outputting, on a display device, a visual notification of the gaming system orchestration.

16. The memory device of claim 15, wherein the operations further include identifying historical gaming records that correspond to the game space.

17. The memory device of claim 15, wherein the operations further include scoring the game space.

18. The memory device of claim 15, wherein the operations further include scoring the hardware inventory.

19. The memory device of claim 15, wherein the operations further include scoring the network survey.

20. The memory device of claim 15, wherein the operations further include receiving a state generated by the game space and generating the gaming recommendation based on the state generated by the game space.

* * * * *